(12) United States Patent
Jang

(10) Patent No.: US 6,526,283 B1
(45) Date of Patent: Feb. 25, 2003

(54) DEVICE AND METHOD FOR TRACKING LOCATION OF MOBILE TELEPHONE IN MOBILE TELECOMMUNICATION NETWORK

(75) Inventor: Jae-Shin Jang, Seoul (KR)

(73) Assignee: Samsung Electronics Co, LTD, Suwon (KR)

( * ) Notice: Subject to any disclaimer, the term of this patent is extended or adjusted under 35 U.S.C. 154(b) by 0 days.

(21) Appl. No.: 09/490,623

(22) Filed: Jan. 24, 2000

(30) Foreign Application Priority Data

Jan. 23, 1999 (KR) .............................................. 99-2068

(51) Int. Cl.[7] .................................................. H04Q 7/20
(52) U.S. Cl. ........................ 455/456; 455/440; 455/560
(58) Field of Search .................................. 455/456, 457, 455/414, 440, 441, 561, 560

(56) References Cited

U.S. PATENT DOCUMENTS

| | | | | |
|---|---|---|---|---|
| 5,327,144 A | * | 7/1994 | Stilp et al. .................. 342/387 |
| 5,504,492 A | * | 4/1996 | Class et al. ................. 455/12.1 |
| 5,890,068 A | * | 3/1999 | Fattouche et al. ........... 455/456 |
| 5,974,329 A | * | 10/1999 | Wylie et al. ................. 455/456 |
| 5,987,329 A | * | 11/1999 | Yost et al. ................... 455/456 |
| 6,026,304 A | * | 2/2000 | Hilsenrath et al. .......... 455/456 |
| 6,097,959 A | * | 8/2000 | Yost et al. ................... 455/456 |
| 6,154,657 A | * | 11/2000 | Grubeck et al. ............. 455/456 |
| 6,246,884 B1 | * | 6/2001 | Karmi et al. ................ 455/521 |

\* cited by examiner

*Primary Examiner*—Thanh Cong Le
*Assistant Examiner*—Thuan T. Nguyen
(74) *Attorney, Agent, or Firm*—Steve Cha; Cha & Reiter

(57) ABSTRACT

A device and method for tracking the location of a mobile telephone in multipath fading and a non-line-of-sight environment. In the device for tracking the location of a mobile telephone, each of a plurality of base stations receives a predetermined signal from the mobile telephone and calculates the distance between the mobile telephone and the base station based on the time of arrival of the signal at the base station. A location data processor receives information about the distances from the base stations, draws circles with the radii being the distances and the coordinates of the base stations at the centers thereof around the base stations, and determines the location of the mobile telephone using location tracking curves connecting the intersection points of the circles.

20 Claims, 8 Drawing Sheets

DEVICE AND METHOD FOR TRACKING LOCATION OF MOBILE TELEPHONE IN MOBILE TELECOMMUNICATION NETWORK

CLAIM OF PRIORITY

This application makes reference to, incorporates the same herein, and claims all benefits accruing under 35 U.S.C. Section 119 from an application for DEVICE AND METHOD FOR TRACKING LOCATION OF MOBILE TELEPHONE IN MOIBLE TELECOMMUNICATION NETWORK filed in the Korean Industrial Property Office on Jan. 23, 1999 and there duly assigned Serial No. 99-2068.

BACKGROUND OF THE INVENTION

1. Field of the Invention

The present invention relates generally to a mobile telecommunication system, and in particular, to a device and method for effectively tracking the location of a mobile telephone in multipath fading characterstics and the non-line-of-sight (NLOS) environment.

2. Description of the Related Art

A mobile telecommunication network allows a registered mobile subscriber to make a call to anyone anywhere and at any time. FIG. 1 illustrates the configuration of a typical mobile telecommunication network. As shown in FIG. 1, the mobile telecommunication network includes a plurality of base stations (BSs) 21 to 24 for providing mobile telecommunication service to a mobile subscriber through a mobile telephone 10, a base station controller (BSC) 30 for controlling the BSs 21 to 24, and a mobile switching center (MSC) 50 for connecting the BSC 30 to another BTS or a PSTN (Public Switched Telephone Network).

In a cellular mobile telecommunication network, the whole service area is divided into a plurality of coverage areas having respective base stations (BS) therein. Each BS coverage area is called a "cell." An MSC controls these BSs so that a subscriber can continue his call without interruption while moving between different cells.

The MSC 50 can reduce the time required for calling a subscriber by locating the cell of the subscriber. In case of an emergency like a fire, or a patient needing first aid treatment, the mobile subscriber should be accurately located. Tracking the location of a mobile subscriber within the boundary of a cell in a mobile telecommunication network is known as "location service."

A mobile telephone can be located by the mobile telephone itself or through a mobile telecommunication network.

To locate the mobile telephone by itself, the mobile telephone is provided with a GPS (Global Positioning System) receiver to calculate its location in latitude and longitude coordinates based on the location information received from a satellite through the GPS receiver. The requirement of having the extra GPS receiver, however, increases the price and the size of the mobile telephone. Another shortcoming with this method is that the load on the mobile telephone is increased because it has to calculate its location.

As an alternative to locating the mobile telephone by itself, the mobile telephone calculates its location by a trigonometry based on the signals received from at least three BSs. This method also increases the price and the size of the mobile telephone due to the requirement of a separately procured signal receiver. Further, the mobile telephone has a higher load because it has to calculate its location, and sometimes it cannot operate compatibly with other BSs employing a different scheme.

In the case that the mobile telephone network locates the mobile telephone, at least three BSs receive a signal from the mobile telephone, calculate the distances between the BSs and the mobile telephone using the arrival time of the signals at the BSs, then determine the location of the mobile telephone using the trigonometry. This location service is provided generally by a location data processor 40 included in a BSC or in by independently provided device. Upon a request for service about the location of a specific mobile subscriber, i.e., a mobile telephone of a user, the BSC 30 selects the BSs 21, 22, and 23 surrounding the mobile telephone for use in the location service, and these selected BSs 21, 22, and 23 are ready for communication with the mobile telephone.

The mobile telephone network can calculate the location of the mobile telephone using the time of arrival (TOA) or the time difference of arrival (TDOA).

The TOA method calculates the distance of a mobile telephone and a BS based on the TOA of a signal transmitted from the mobile telephone at the BS. That is, it is assumed that the mobile telephone is located at the intersection point of three circles having the radius of the distances between the BSs and the mobile telephone.

The TDOA method assumes that the TDOAs of a signal transmitted from the mobile telephone at the three BSs define a set of points on a hyperbola, and the mobile telephone is located at the intersection point of at least three hyperbolas. The implementation of this method requires accurate synchronization of each BS, as compared to the TOA method. However, the burden of synchronization is negligible as all the CDMA BSs are already synchronized to one another using their GPS receivers.

As described above, the network tracks the location of a mobile telephone using a specific signal transmitted from the mobile telephone. However, the signal of the mobile telephone is often propagated to a BS in a path longer than the distance between the mobile telephone and the BS due to the multipath fading characteristic and the NLOS effects in a real mobile telecommunication environment. In this case, at least three circles or hyperbolas do not meet at one point but overlap each other over an area. Therefore, the location data processor 40 should detect the most likely point where the mobile telephone is located in the overlap area.

FIG. 2 illustrates a typical TOA method for locating a mobile telephone. As shown in FIG. 2, three circles 101, 102, and 103, whose radiuses are the distance between the mobile telephone 10 and at least three BSs 21, 22, and 23, are overlapped across an area indicated as 1. The mobile telephone 10 is located in the overlap area 1.

One approach to locating the mobile telephone 10 in the overlap area 1 is to use a common chord, as shown in FIG. 3. When at least three circles 111, 112, and 113 are overlapped over an area without meeting at one point, the mobile telephone 10 is considered to exist at the intersection point of three common chords 114, 115, and 116. The three common chords 114, 115, and 116 are defined by the intersection points of the circles 111, 112, and 113. A common chord is defined as a line connecting two points where two circles intersect.

The above method using the common chord is not very accurate in locating the mobile telephone except in the case where the mobile telephone is an approximate equal distance apart from the selected BSs and in a similar propagation environment to each respective BS. In the case that a first mobile telephone 11 is nearer to the first BS 21, as shown in FIG. 4, the procedure will be described by a way of example.

In FIG. 4, two circles 131 and 132 are drawn based on the TOAs of a signal transmitted from the first mobile telephone 11 at the first and the second BSs 21 and 22. A first common chord 133 is defined by the intersection between the circles 131 and 132. But if the path between the first mobile telephone 11 and the second BS 22 is in an NLOS condition and the path between the first mobile telephone 11 and the first BS 21 is in a line-of-sight LOS) condition, the common chord 133 is positioned far left from the actual location of the mobile telephone 11.

The effect is the same in the opposite case. If the path between the first mobile telephone 11 and the second BS 22 is in the LOS condition and the path between the first mobile telephone 11 and the first BS 21 is in the NLOS condition, the common chord 133 is also far right from the actual location of the mobile telephone 11.

As noted from the example shown in FIG. 4, the locating method using a common chord involves a huge location error unless the paths between the mobile telephone and each BS have the same propagation environment.

Another method of locating the mobile telephone in the overlap area 1 is to use a least square (LS) scheme. For details of the LS method, see J. J. Caffery and G. L. Stuber, "Subscriber Location in CDMA Cellular Networks", IEEE Trans. on Vehi. Technol. VT-47, no. 2, pp. 406–415, May 1998, and H. Hashemi, "Pulse Ranging Radiolocation Technique and Its Application to Channel Assignment in Digital Cellular Radio", in Proc. of IEEE VTC '91, 1991, pp. 675–680.

In the LS method, assuming that a mobile telephone at position $(x_0, y_0)$ transmits a specific signal at time $\tau_0$, N BSs at positions $(x_1, y_1), (x_2, y_2), \ldots, (x_N, y_N)$ receive the signal at time $\tau_1, \tau_2, \ldots, \tau_N$, and a light speed is c, the location of the mobile telephone with respect to an ith BS is (x, y) satisfying $f_i(x, y, \tau) = 0$ in the following equation:

$$f_i(x, y, \tau) = c(\tau_i - \tau) - \sqrt{(x_i - x)^2 + (y_i - y)^2} \qquad (1)$$

N circles are drawn by repeating the above procedure for the N BSs. To locate the mobile telephone, therefore, a function $F(x, y, \tau)$ is defined as $$F(x, y, \tau) = \sum_{i=1}^{N} \alpha_i^2 f_i^2(x, y, \tau) \qquad (2)$$

where $\alpha_i^2$ is a weighting factor for an ith signal path and $0 \leq \alpha_i^2 \leq 1$. A location data processor assigns a small $\alpha_i^2$ to an NLOS path between the BS and the mobile telephone and a large $\alpha_i^2$ to an LOS path between the BS and the mobile telephone, thereby reducing the location error caused by different propagation environments.

Therefore, the location data processor can track the location of the mobile telephone by obtaining the position (x, y) which minimizes Eq. 2. However, as Eq. 2 is non-linear, it takes a complicated process to directly obtain the intended value. Hence, an iteration method has been suggested in which an intended value is calculated by an approximation method. According to this method, Eq. 1 is expanded to a Taylor series and only the first-order terms of the Taylor series expansion are linearized (see, G. L. Turin, et. al., "Simulation of Urban Vehicle Monitoring Systems", IEEE Trans. on Vehi. Technol., VT-21, pp. 1–9, February 1972). Yet, the iteration method also has a distinctive shortcoming in that the converging operation involves errors if the mobile telephone is near the BS or the circle of the BS.

While a gradient descent method can be considered (see, J. J. Caffery and G. L. Stuber, "Subscriber Location in CDMA Cellular Network", IEEE Trans. on Vehi. Technol., VT-47, no. 3, pp. 406–415, May 1998), the problem of a longer converging time than the iteration method using a Taylor series should be solved before it can be put to wide use.

SUMMARY OF THE INVENTION

It is, therefore, an object of the present invention to provide a method of tracking the location of a mobile telephone using curves connecting the points where circles intersect one another, the circles' radiuses being the distances between BSs and the mobile telephone.

The object of the present invention can be achieved by providing a device and method for tracking the location of a mobile telephone. According to the device for tracking the location of a mobile telephone, each of a plurality of base stations receives a predetermined signal from the mobile telephone and calculates the distance between the mobile telephone and the base station based on the time of arrival of the signal at the base station. A location data processor receives information about the distances from the base stations, draws circles with the radii being the distances and the coordinates of the base stations at the centers thereof around the base stations, and determines the location of the mobile telephone using location tracking curves connecting the intersection points of the circles.

The location data processor selects a pair of circles among the circles, draws a location tracking curve connecting the intersection points between the selected pair of circles, and draws a location tracking curve for each of the other pairs of circles. The location tracking curve derived from the selected circle pair is a part of a circle with a center within the circle corresponding to the base station with the smaller variances of the times of arrival of the received signal between the two base stations corresponding to the selected circle pair. The circles formed by the location tracking curves have the centers thereof on a line connecting the centers of the selected circle pair.

The location data processor locates the mobile telephone by averaging the coordinates of the intersection points among the location tracking curves of the selected circle pair.

In the method of tracking a mobile telephone in a mobile telecommunications network: (a) each base station nearer to a mobile telephone receives a predetermined signal from the mobile telephone and calculates the distance between the mobile telephone and the base station and the variances of time arrival of the signal at the base station; (b) a circle is drawn to have a radius being the distance and the coordinates of the base station at the center thereof around the base station; (c) a pair of the first and the second base stations is selected among the base stations and a plurality of location tracking curves connecting two intersection points between the circles corresponding to the first and the second base stations are drawn; (d) one of the location tracking curves is selected using the variances of the first and the second base stations; (e) the steps (c) and (d) are repeated for the other pairs of the base stations; (f) the intersection points are obtained among the location tracking curves selected in step (d) and (e); and, (g) the location of the mobile telephone is determined using the coordinates of the intersection points obtained in step (f).

The plurality of location tracking curves are parts of circles with centers near to the base station with smaller variances between the first and the second base stations. The circles formed by the location tracking curves have the centers thereof on a line connecting the coordinates of the first and the second base stations.

The larger variances between the variances of the first and the second base stations are compared to the variances of the plurality of location tracking curves, and one of the location tracking curves is selected according to the comparison result.

The location coordinates of the mobile telephone are determined by averaging the coordinates of the intersection points obtained in step (f).

The present invention locates the location of a mobile telephone by drawing a plurality of circles with the radii being the distances between a mobile telephone and a plurality of base stations and the base stations at their centers, and using location tracking curves connecting the intersection points between each circle pair instead of the common chords defined by the circles.

A BRIEF DESCRIPTION OF THE DRAWINGS

The above and other objects, features and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described hereinbelow with reference to the accompanying drawings. For the purpose of clairty, well-known functions or constructions are not described in detail as they would obscure the invention in unnecessary detail.

Figure 1:
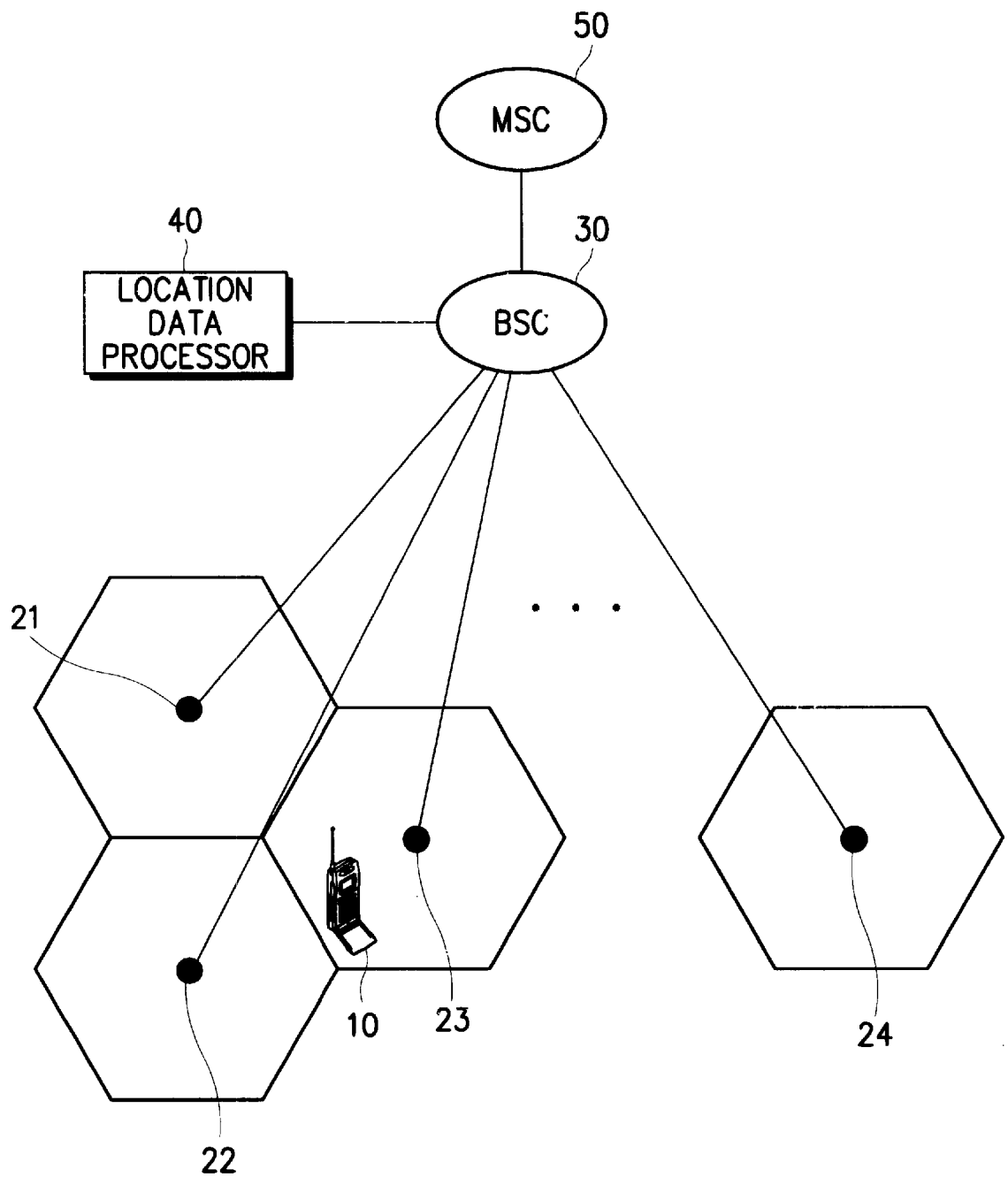
FIG. 1 illustrates the configuration of a typical mobile telecommunication network.
Figure 2:
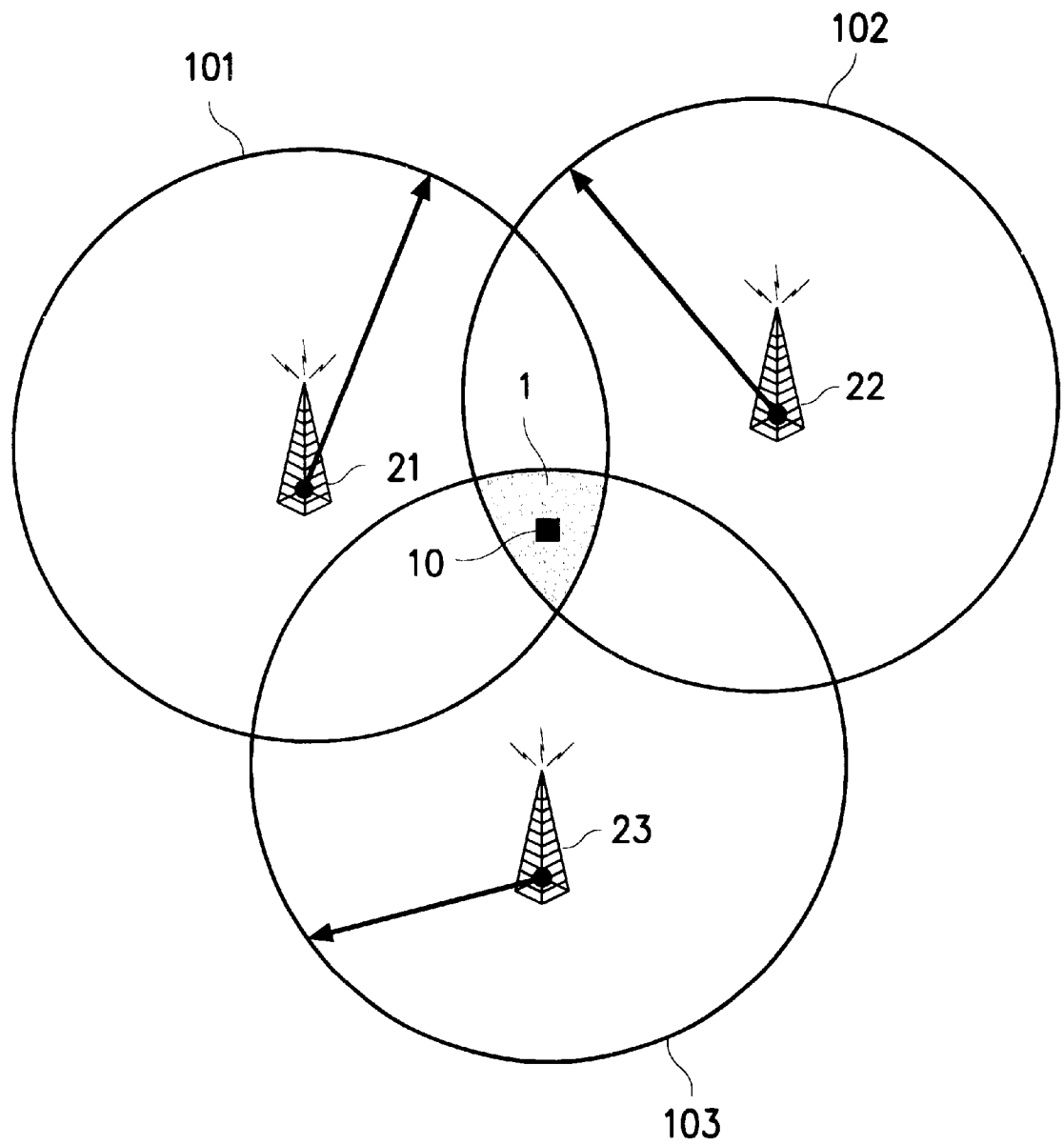
FIG. 2 illustrates a typical TOA method for locating a mobile telephone.
Figure 3:
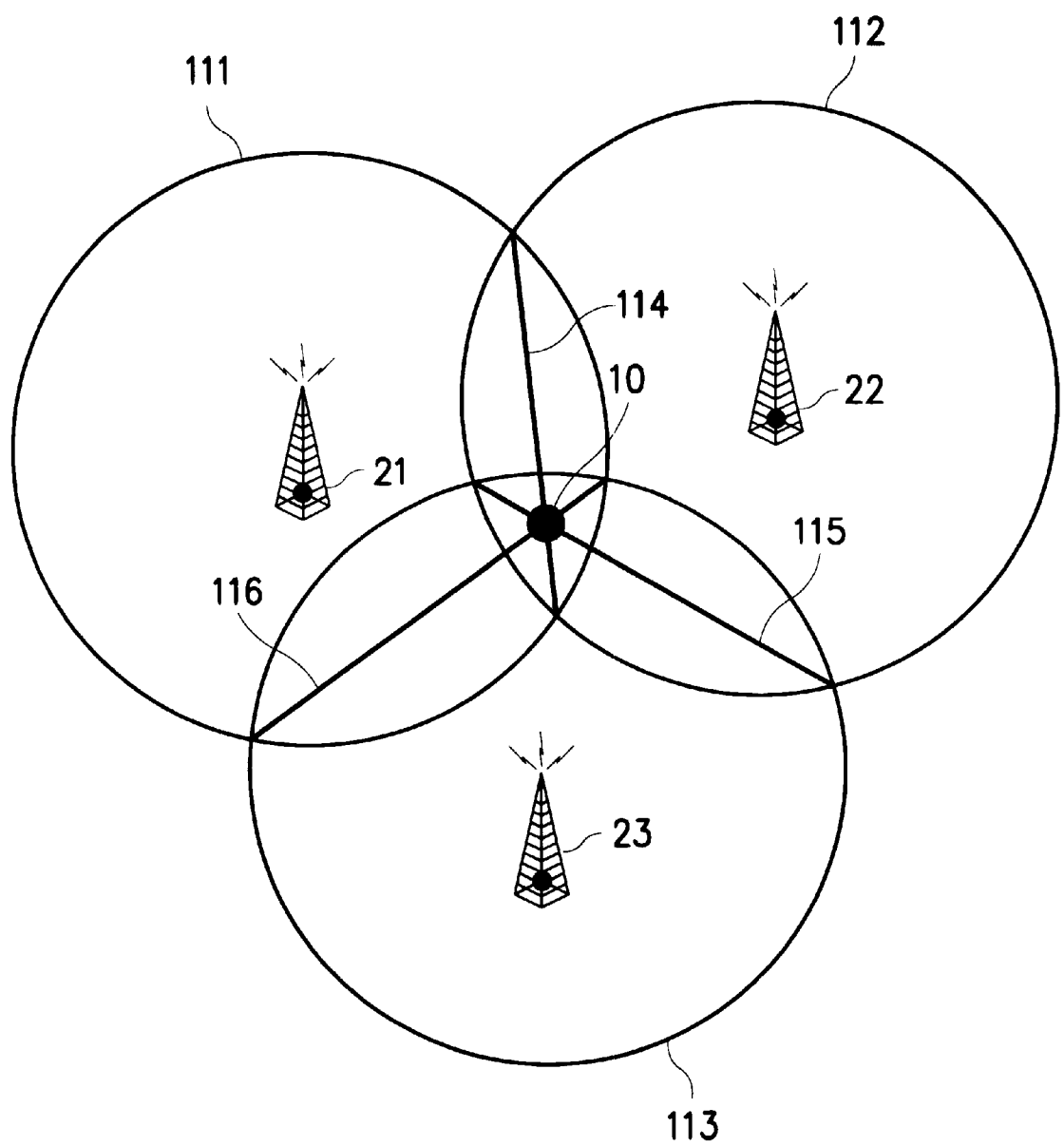
FIG. 3 illustrates a typical common chord-using method for locating a mobile telephone.
Figure 4:
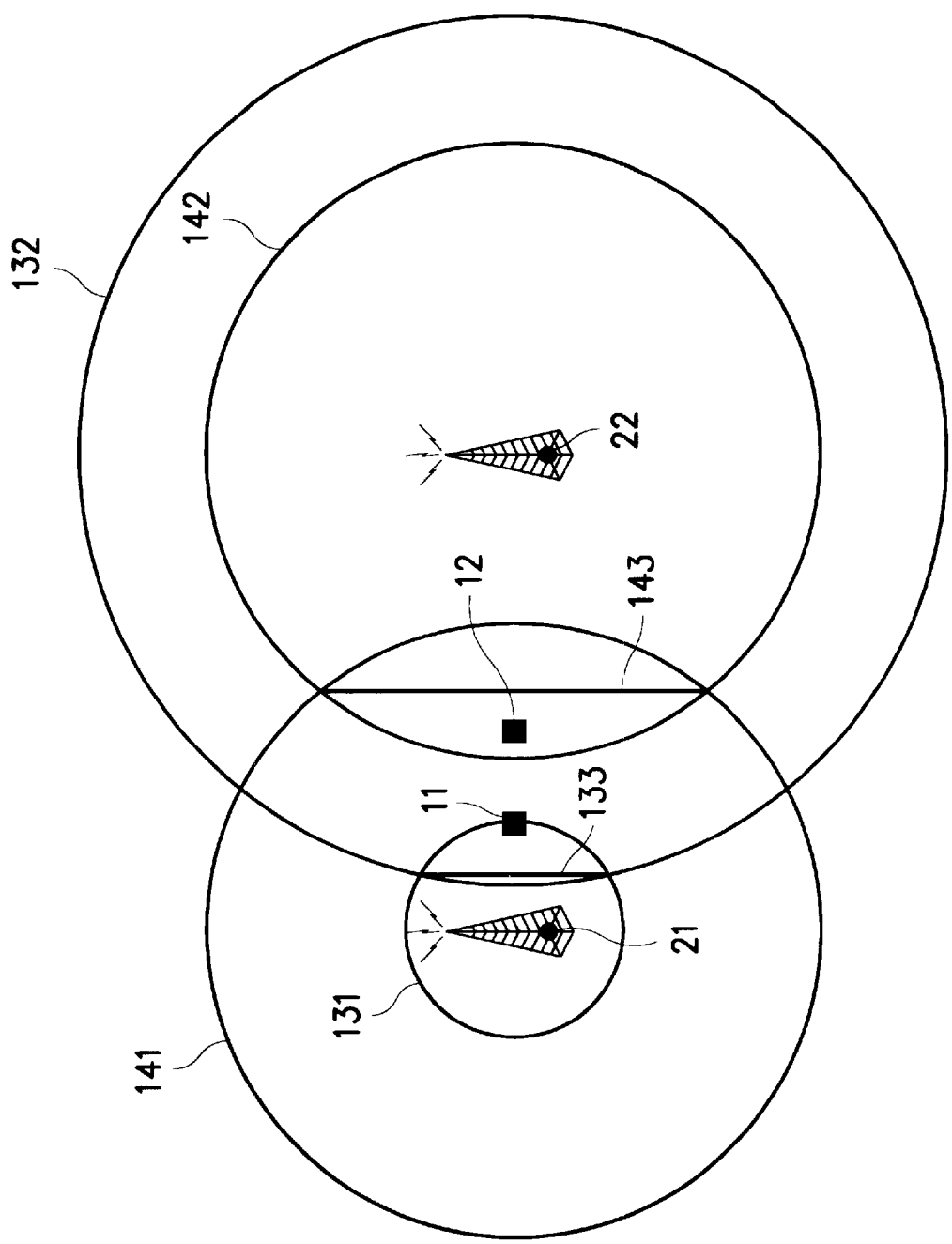
FIG. 4 illustrates a conventional mobile telephone locating method incurring errors.
Figure 5:
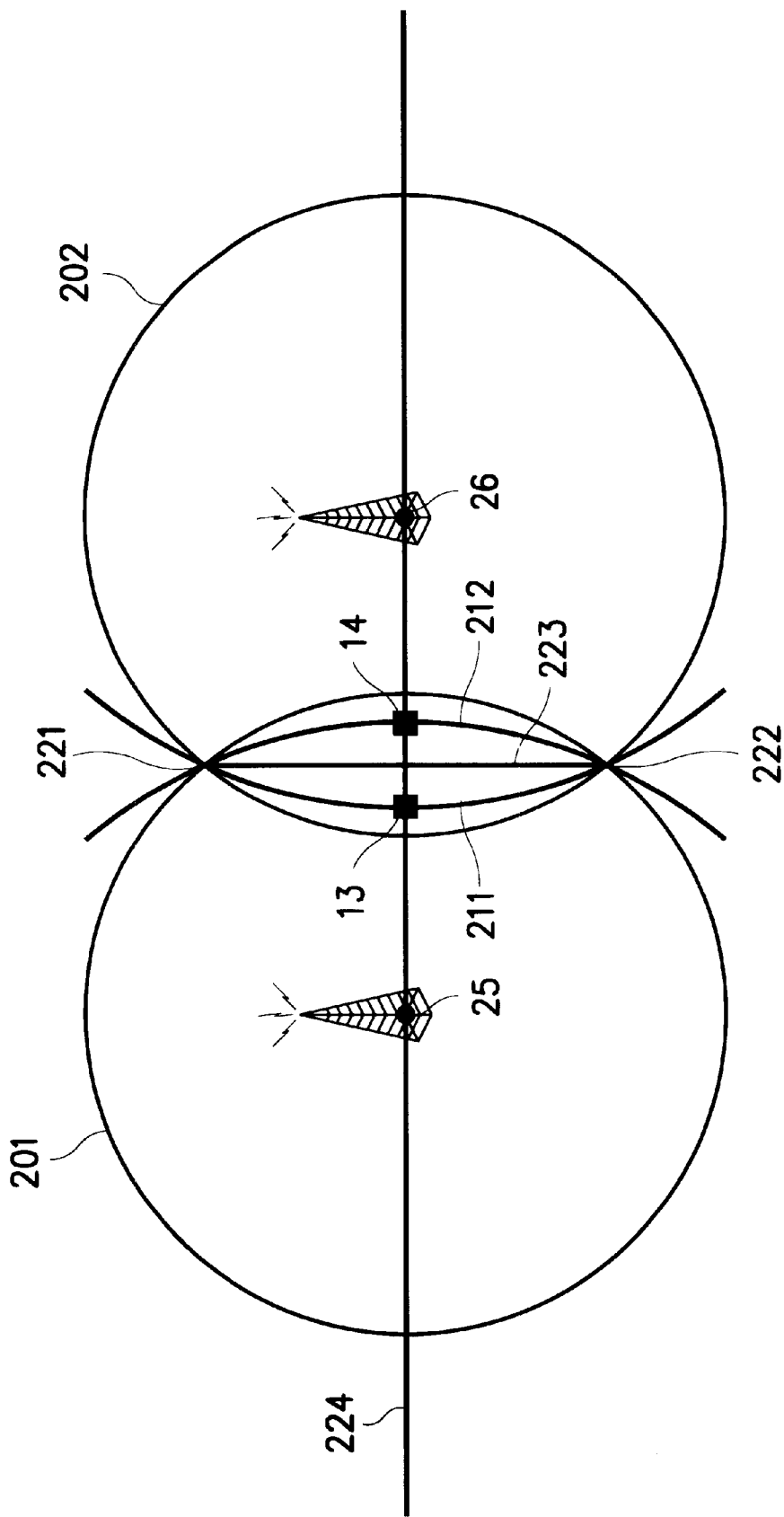
FIG. 5 illustrates a mobile telephone locating method according to the present invention.

FIG. 5 illustrates a mobile telephone locating method according to the present invention. The concept of locating the mobile telephone in the present invention will be described referring to FIG. 5.

Upon request for a location service about a specific mobile telephone by a user or a network, the location data processor draws two circles 201 and 202 with their respective centers set at BSs 25 and 26 based on the TOAs of a specific signal transmitted from the corresponding mobile telephone 13 or 14 to the two BSs 25 and 26 located near the mobile telephone 13 or 14. The two circles 201 and 202 define a common chord 223. However, if each mobile telephone 13 or 14 is placed in a different propagation environment with respect to the BSs 25 and 26, the location of the mobile telephone 13 or 14 can not be determined by the common chord 223.

Therefore, the present invention uses location tracking curves 211 and 212 connecting the same two intersection points 221 and 222 of the two circles 201 and 202, instead of the common chord 223. The process of determining the location tracking curves will be explain later in the embodiment. The two curves 211 and 212 have their middle points intersecting the line 224, which connects the positions of the two BSs 25 and 26 and the parts of two circles 201 and 202 drawn to connect the two intersection points 221 and 222. Let's rename this location tracking curves a reference cycle. The equations of these reference circles 211 and 212 can be easily obtained.

Instead of the common chord 223, the location data processor uses the curve 211 for the mobile telephone 13 and the curve 212 for the mobile telephone 14, thus preventing the location error caused by the multipath fading or the NLOS path characteristic in the radio environment.

If the radio propagation environment between the mobile telephone and the BS is poor due to the multipath fading or the NLOS effects, the TOA of the received signal has error. The TOA error can be compensated by appropriately selecting a desired curve (reference circle).

The variances of a plurality of signals received at a specific BS in a plurality of paths from a mobile telephone can be used to determine the presence or the absence of the multi-fading and the NLOS effects and to select an appropriate curve (see M. P. Wylie and J. Holtzman, "The Non-Line-Of-Sight Problem in Mobile Location Estimation", Proc. of IEEE ICUPC'96, 1996, pp. 827–831).

The above document compares the NLOS environment with the LOS environment and discloses that the variances of the TOAs of a signal transmitted from a mobile telephone are higher in the NLOS environment. In light of this knowledge, appropriate curves can be selected by comparison between the variances of TOAs of an input signal. That is, it is highly likely that the mobile telephone is nearer from the common chord 223 to one with the larger variances out of the two BSs in FIG. 5. Therefore, the BS with the smaller variances should be selected to draw reference circles based on the variances. For example, since the first mobile telephone 13 is near the first BS 25, the variances of the TOAs of a signal transmitted from the mobile telephone 13 at the first BS 25 will be higher than those of the signal at the second BS 26. Hence, the reference circle 211 is obtained around the second BS 26 with smaller variances.

There will be given a detailed description of a mobile telephone locating method according to a preferred embodiment of the present invention.

Figure 6:
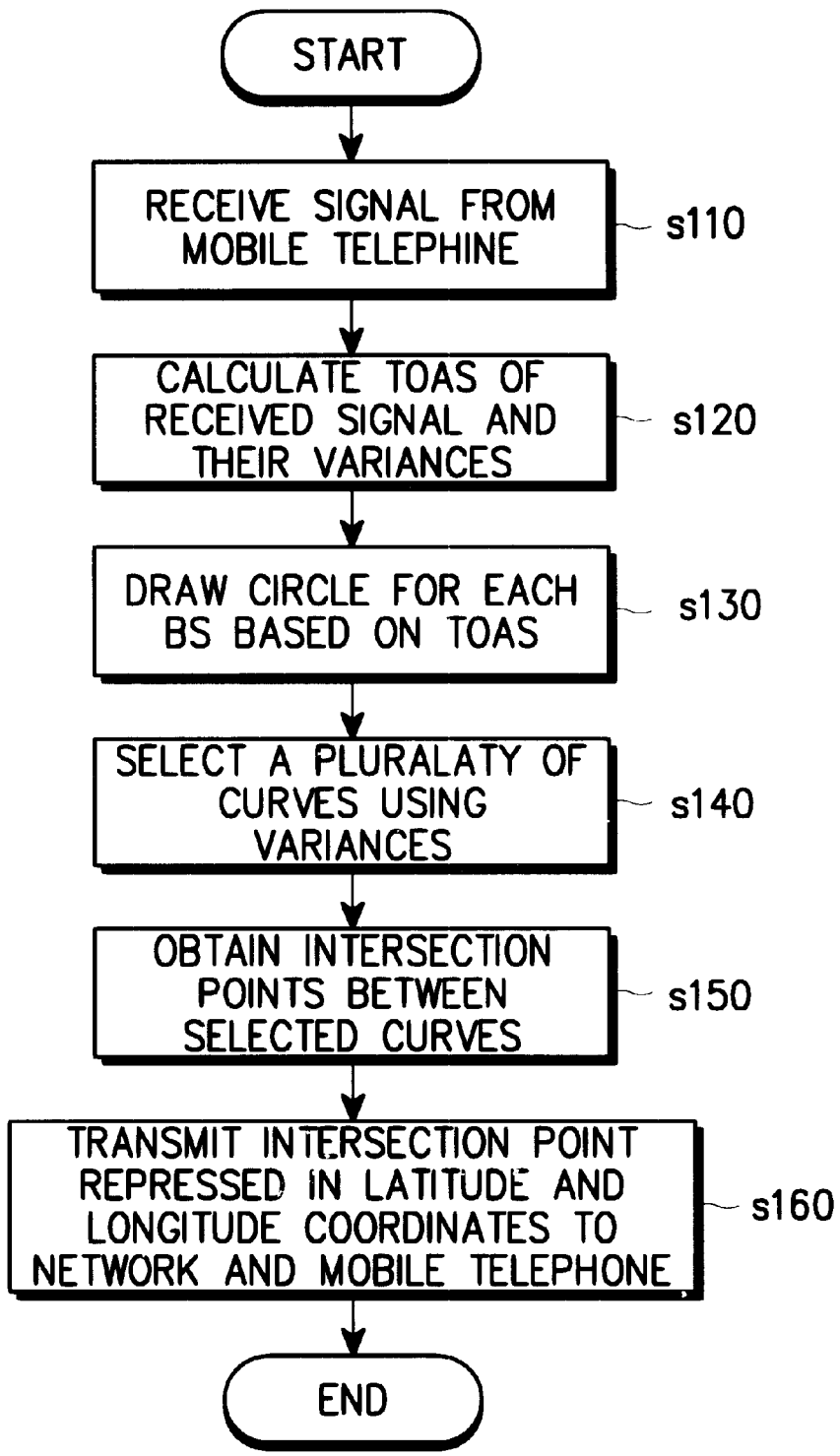
FIG. 6 is a flowchart illustrating an embodiment of the mobile telephone locating method according to the present invention.

FIG. 6 is a flowchart depicting an embodiment of a mobile telephone locating method according to the present invention. Referring to FIG. 6, the mobile telephone locating method includes the steps of receiving a specific signal from the mobile telephone in a different propagation path by each of the BSs (s110), calculating the TOAs of the signal at each BSs and their variances (s120), calculating the distance between the mobile telephone and the BS using the measured TOAs and drawing a circle with the BS at its center and a radius being the calculated distance (s130), selecting a plurality of curves for each BS pair using the TOA variances calculated by each BS (s140), obtaining the intersection points of the selected curves to track the location of the mobile telephone (s150), and, transmitting the intersection points expressed in the latitude and the longitude coordinates to a network and the mobile telephone (s160). These steps will be described in more detail referring to FIGS. 7 and 8.

When a user or a network requests a location service about a specific mobile telephone, a BSC selects at least three BSs for use in the location service among the BSs near the mobile telephone on the basis of the location of the mobile telephone.

The mobile telephone transmits a signal in a predetermined form between the mobile telephone and the BSs for location tracking purpose, so that the BSs can recognize the signal easily.

Each BS receives the signal from the mobile station in a multipath in step s110. The BS calculates the TOAs of the received signal and their variances and transmits the data to the location data processor in step s120.

In step s130, the location data processor calculates the distance between the mobile telephone and each BS based on the received data and draws circles each having the corresponding BS at its center and a radius being the distance between the BS and the mobile telephone.

Figure 7:
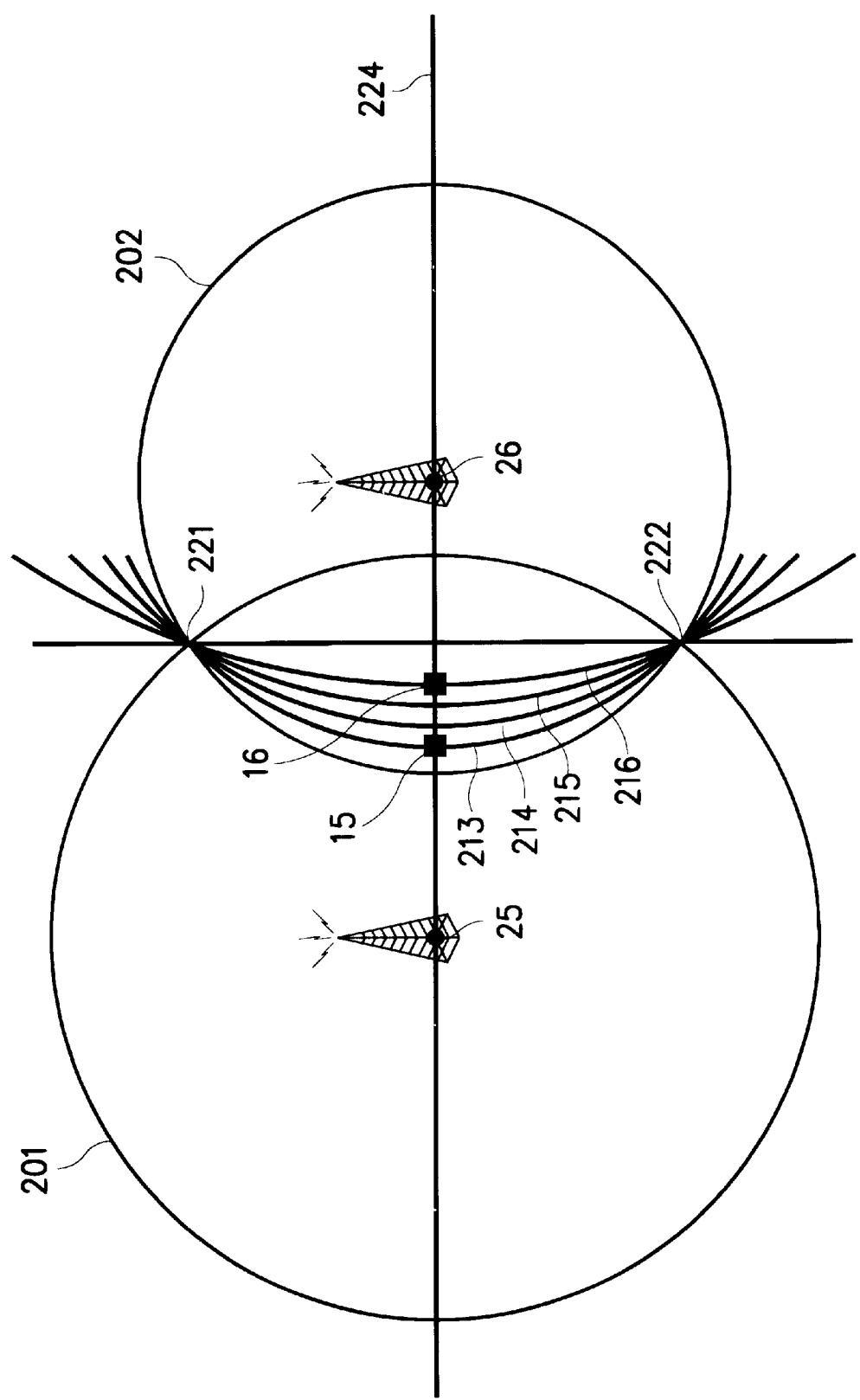
FIG. 7 illustrates the step of selecting a plurality of curves using the variances of TOAs in the mobile telephone locating method of FIG. 6; and, FIG. 8 illustrates the intersection point among selected curves in the mobile telephone locating method of FIG. 6.

Referring to FIG. 7, assuming that the first and the second BSs 25 and 26 selected for use in the location tracking are present at positions $(x_1, y_2)$ and $(x_2, y_2)$, respectively, in the second-dimensional coordinates, the location data processor draws the two circles 201 and 202 with the coordinates $(x_1, y_1)$ and $(x_2, y_2)$ of the two BSs 25 and 26 at their centers, in step s130.

The curve applied to the present invention connects the two points 221 and 222 at which the two circles 201 and 202 intersect each other. The coordinates of the intersection points 221 and 222 are $(x_A, y_A)$ and $(x_B, y_B)$, respectively. The curve is also a part of a reference circle with its center on the line 224 passing through the coordinates $(x_1, y_1)$ and $(x_2, y_2)$ of the two BSs 25 and 26.

Since the mobile telephone is near the first BS 25 with respect to the common chord 223, the variances of the TOAs of a signal transmitted from the mobile telephone at the first BS 25 will be larger than those of the signal at the second BS. Therefore, reference circles 213 to 216 are drawn with respect to the second BS 26 with smaller variances, as shown in FIG. 7.

As described above, the coordinates of the reference circle can be easily obtained which has its center on the line 224 passing through $(x_1, y_1)$ and $(x_2, y_2)$ and passes through $(x_A, y_A)$ and $(x_B, y_B)$. Selecting the center of the reference circle is significant as the mobile telephone is located on the reference circle.

In step s140, the location data processor selects curves for use in location tracking. The location data processor selects the desired curves (reference circles) with respect to the plurality of BSs selected for location tracking. It can be noted from FIG. 8 that three curves are selected with respect to three BS pairs produced with three BSs.

In FIG. 7, as the real location of the mobile telephone deviates farther from the circle 202 with the second BS 26 at its center, the center of a reference circle is farther from the location of the second BS 26. That is, the center of a desired reference circle is farther from the second BS 26 in the case of a third mobile telephone 15 (curve 213) than in the case of a fourth mobile telephone 16.

An optimal curve (reference circle) selecting method will be described hereinbelow.

The variances of the TOAs of a signal which arrives at the two BSs 25 and 26 from different paths are used to find the curve on which the actual location of the mobile telephone is determined. For example, if the TOAs of the signal at the first BS 25 from N propagation paths are $t_1, t_2, \ldots, t_N$, the first BS 25 calculates the variances $\sigma_1$ of $t_1, t_2, \ldots, t_N$.

The location data processor compares the variances calculated by the first BS 25 with the variances calculated by the second BS 26 and considers that the mobile telephone is near to the BS with the larger variances (the first BS 26 in FIG. 7). Therefore, the reference circle for a desired curve has its center near to the BS with the smaller variances (the second BS 26 in FIG. 7) on the line 224. With the larger variances, the center of a reference circle gets farther to the right from the center of the second BS 26.

In order to select the desired curve, the location data processor presets the reference circles with predetermined radiuses and the variances of TOAs of a signal transmitted from the mobile telephone located on the reference circles, and compares the preset variances with real variance measurements. To do so, the location data processor sets a plurality of reference circles based on the distances between the mobile telephone and the BS with the smaller variances, i.e., the second BS 26.

In FIG. 7, as an example, the first to the fourth reference circles 213 to 216 have radii twice, three times, four times, and five times, respectively, of that of BS 26, where all these points of reference circles 213 and 216 are located along the line 224 in this order, longer than that of the second BS 26.

The variances of the second BS 26 smaller than those of the first BS 25 are used as a criterion for selecting an optimal reference circle. Therefore, the location data processor predetermines the reference variances for the first to the fourth reference circles 213 to 216 to be compared with those of the second BS 25.

It is assumed in the following description that $\sigma_1$, $\sigma_2$, and $\sigma_3$ are reference variances and $\sigma_1 < \sigma_2 < \sigma_3$.

The location data processor compares the variances calculated by the two BSs 25 and 26 and selects the base station with smaller variances as a reference point to draw the reference circle. If the selected variances (those of the second BS 26) are $\sigma$, the location data processor compares the selected variances, $\sigma$, with the preset reference variances $\sigma_1$, $\sigma_2$, and $\sigma_3$.

If $\sigma \leq \sigma_1$, the curve of the first reference circles 213 is selected;

If $\sigma_1 < \sigma \leq \sigma_2$, the curve of the second reference circles 214 is selected;

If $\sigma_2 < \sigma \leq \sigma_3$, the curve of the third reference circles 215 is selected; and, If $\sigma_3 < \sigma$, the curve of the fourth reference circles 216 is selected.

From the above procedure, the location data processor selects the optimal curve (reference circle) for the two BSs among the plurality of BSs, and selects another optimal circle for another BS pair, and so on.

Figure 8:
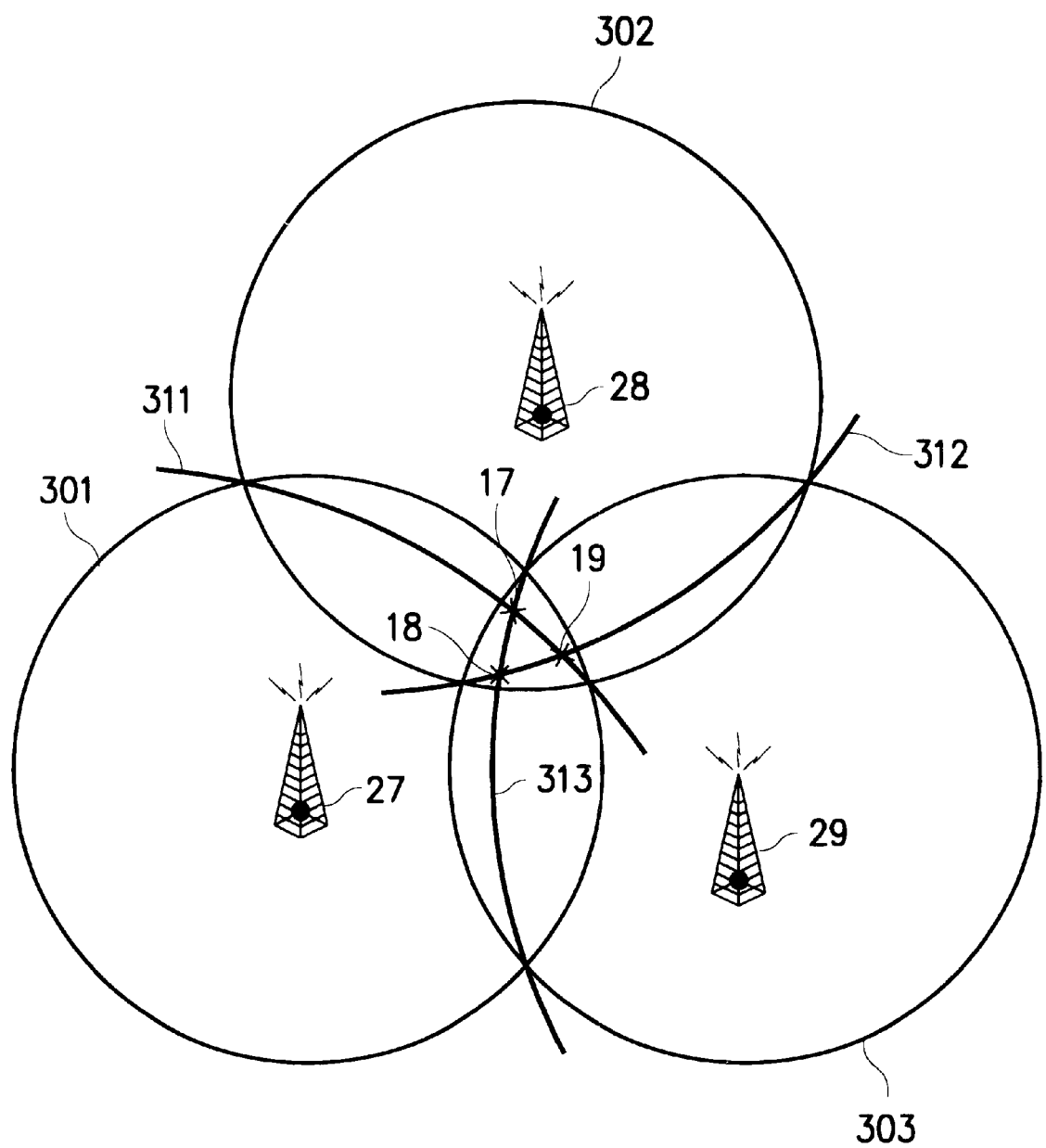

When curves are selected for all selected BS pairs, the location data processor obtains the intersection points among the selected curves as shown in FIG. 8, in step s150. However, as the selected curves do not intersect at one point due to the multipath fading or the NLOS effects, the midpoint of these intersection points is determined as the location of the mobile telephone.

Tracking the location of a mobile telephone requires at least three BSs. As shown in FIG. 8, the first to the third BSs 27 to 29 form the first to the third circles 310 to 303, respectively.

The location data processor selects a first optimal curve 311 for the first and the second BSs 27 and 28, a second optimal curve 312 for the second and the third circles 302 and 303, and a third optimal curve 313 for the first and third circles 301 and 303. As the three intersection points 17 ($x_a$, $y_a$), 18 ($x_b$, $y_b$), and 19 ($x_c$, $y_c$) are defined by the three curves 311 to 313, the location data processor considers the mobile telephone to be located at (x, y), which satisfies the following equation:

$$x = \frac{x_b + x_b + x_c}{3}, \qquad y = \frac{y_a + y_b + y_c}{3} \qquad (3)$$

While the three BSs are selected for the location service using the TOAs of a signal arrived at each BS from a mobile telephone has been described in the embodiment of the present invention, more BSs can be used to increase the accuracy in locating the exact position of the mobile station.

If Nth intersection points are defined by location tracking curves obtained according to the present invention and an ith intersection point is at ($x_i$, $y_i$), Eq. 3 is expanded to Eq. 4 and coordinates (x, y) satisfying Eq. 4 are determined to indicate the location of the mobile telephone.

$$x = \frac{x_1 + x_2 + \ldots + x_i + \ldots + x_N}{N}, \qquad (4)$$
$$y = \frac{y_1 + y_2 + \ldots + y_i + \ldots + y_N}{N}$$

After the location of the mobile telephone, that is, the intersection points among the curves are obtained, the location data processor represents the intersection points in the latitude and the longitude coordinates and transmits the position coordinates to the network (BS/BSC/MSC) and the mobile telephone.

As described above, the present invention is advantageous in that the location of a mobile telephone can be accurately tracked even in the multipath fading and the NLOS environment, by using more accurate curves connecting the intersection points among circles with the radii being the distances between corresponding BSs and the mobile telephone in a cellular mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for tracking a location of a mobile unit in a mobile telecommunication network, comprising:
   a mobile telephone;
   a plurality of base stations for receiving a predetermined signal from said mobile telephone, for calculating the distance between said mobile telephone and each said base station based on time of arrival (TOA) of said predetermined signal and for calculating variances of the TOAs of said predetermined signal at each base station; and,
   a location data processor for receiving information about the respective distances from each said base station to said mobile telephone, for drawing respective circles around respective said base stations having the respective distance as the respective radius, and for determining the location of said mobile telephone based on a plurality of location tracking curves drawn to connect the intersection points of said plurality of circles.

2. The device of claim 1, wherein said location data processor selects one pair of circles among said plurality of circles, draws said location tracking curve connecting the intersection points between said selected pair of circles, and draws said location tracking curves for the other pairs of said plurality of circles.

3. The device of claim 2, wherein said location tracking curve derived from said selected pair of circles is drawn with respect to said base station having smaller variances of the TOA of said predetermined signals.

4. The device of claim 3, wherein the center point of said location tracking curve intersects a line connecting the centers of said selected pair of circles.

5. The device of claim 1, wherein said location data processor locates said mobile telephone using coordinates of the intersection locations among said location tracking curves for each said selected pair of circles.

6. The device of claim 5, wherein said location data processor locates said mobile telephone by averaging the coordinates of the intersection points among said location tracking curves for each said selected pair of circles.

7. The device of claim 1, wherein the number of said plurality of base stations is at least three.

8. The device of claim 1, wherein the distance between said mobile station and each said base station is determined based on the transmission time of said predetermined signal from said mobile station to said each base station multiplied by the transmission speed of said predetermined signal transmitted from said mobile telephone.

9. The device of claim 8, wherein each of said base station receives information about the transmission time of the predetermined signal from an upper layer base station controller.

10. The device of claim 1, wherein said location data processor is included in a base station controller.

11. A method of tracking the location of a mobile telephone, comprising the steps of:
   (a) receiving a predetermined signal from the mobile telephone, determining the distance between the mobile telephone and a plurality of base station located close to the mobile telephone, and calculating variances of times of arrival (TOA) of the predetermined signal at the base station;
   (b) drawing a circle around the base station with a radius being the determined distance between the mobile station and the base station;
   (c) selecting one pair of a first and a second base stations among the base stations and drawing a plurality of location tracking curves connecting two intersection points between the circles corresponding to the first and the second base stations;
   (d) selecting one of the location tracking curves based on variances of the predetermined signals from the mobile station to the first and the second base stations;
   (e) repeating the steps (c) and (d) for the other pairs of the base stations;
   (f) obtaining intersection points among the location tracking curves selected in step (d) and (e); and,
   (g) locating the mobile telephone using the coordinates of the intersection points obtained in step (f).

12. The method of claim 11, wherein the plurality of location tracking curves is parts of circles with centers near the base station with the smaller variances between the first and the second base stations.

13. The method of claim 12, wherein circles formed by the location tracking curves have the centers thereof on a line connecting the coordinates of the first and the second base stations.

14. The method of claim 11, wherein the step (d) comprises the step of comparing a larger variance between the first and the second base stations with the variance of predetermined signals and selecting one of the location tracking curves according to the comparison result.

15. The method of claim 11, wherein the location coordinates of the mobile telephone are determined by averaging the coordinates of the intersection points obtained in step (f).

16. The method of claim 11, wherein the step (g) of determining the location of mobile station is represented by the following equation:

$$x = \frac{x_1 + x_2 + \ldots + x_i + \ldots + x_N}{N},$$
$$y = \frac{y_1 + y_2 + \ldots + y_i + \ldots + y_N}{N},$$

wherein the N represents the number of intersection points of the location tracking curves obtained in the step (f) and i represents the coordinates ($x_i$, $y_i$) obtained in the step (f) for the intersection point of the location tracking curves (x, y).

17. The method of claim 11, wherein the number of the base stations is at least three.

18. The method of claim 11, wherein the distance between said mobile station and each said base station is determined based on the transmission time of said predetermined signal from said mobile station to said each base station multiplied by the transmission speed of said predetermined signal transmitted from said mobile telephone.

19. The method of claim 18, wherein each of the base stations receives information about the transmission time of the predetermined signal from an upper layer base station controller.

20. The method of claim 11, wherein the plurality of base stations are predetermined for locating the mobile telephone.

* * * * *